United States Patent Office 3,370,677
Patented Feb. 27, 1968

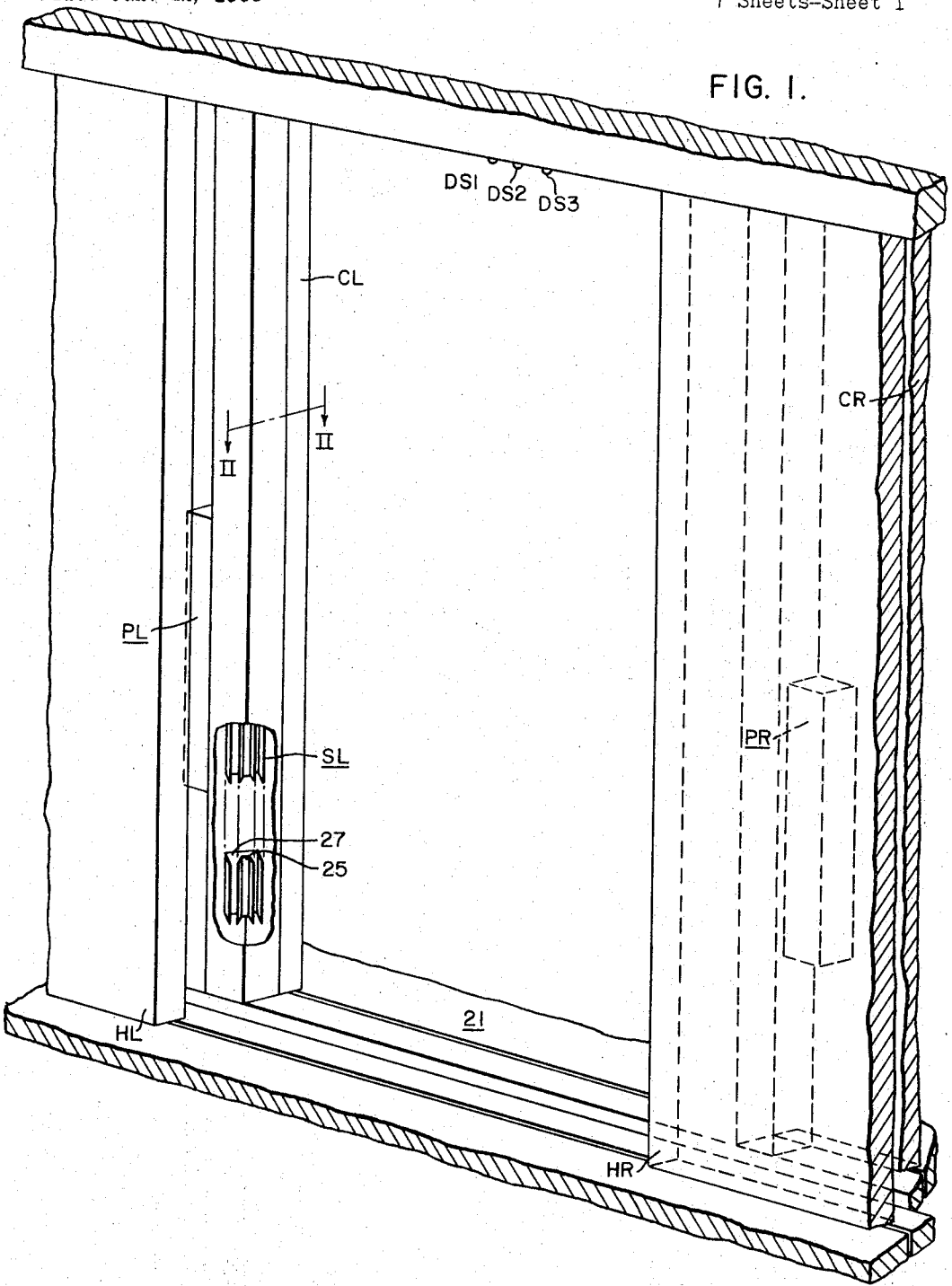

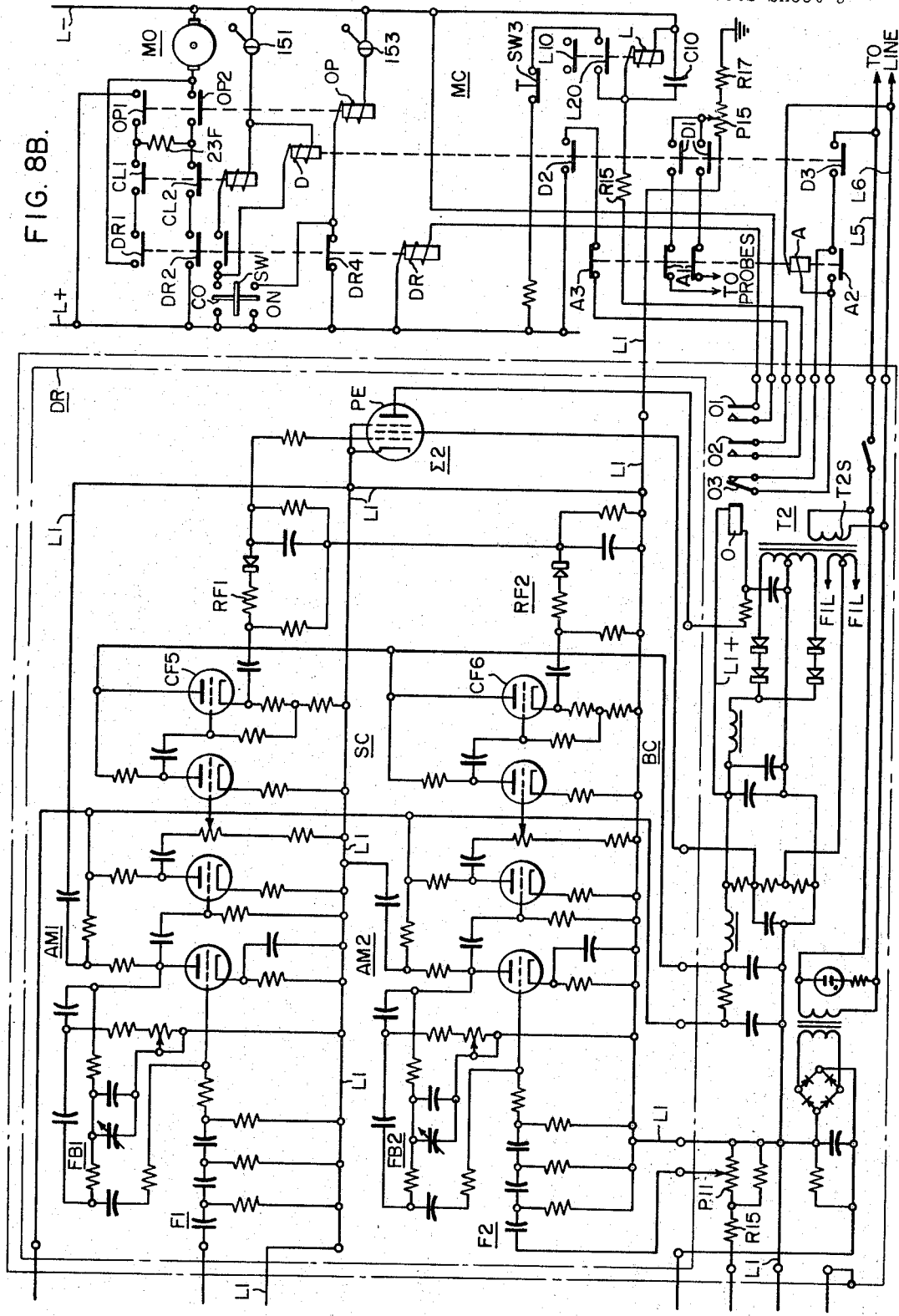

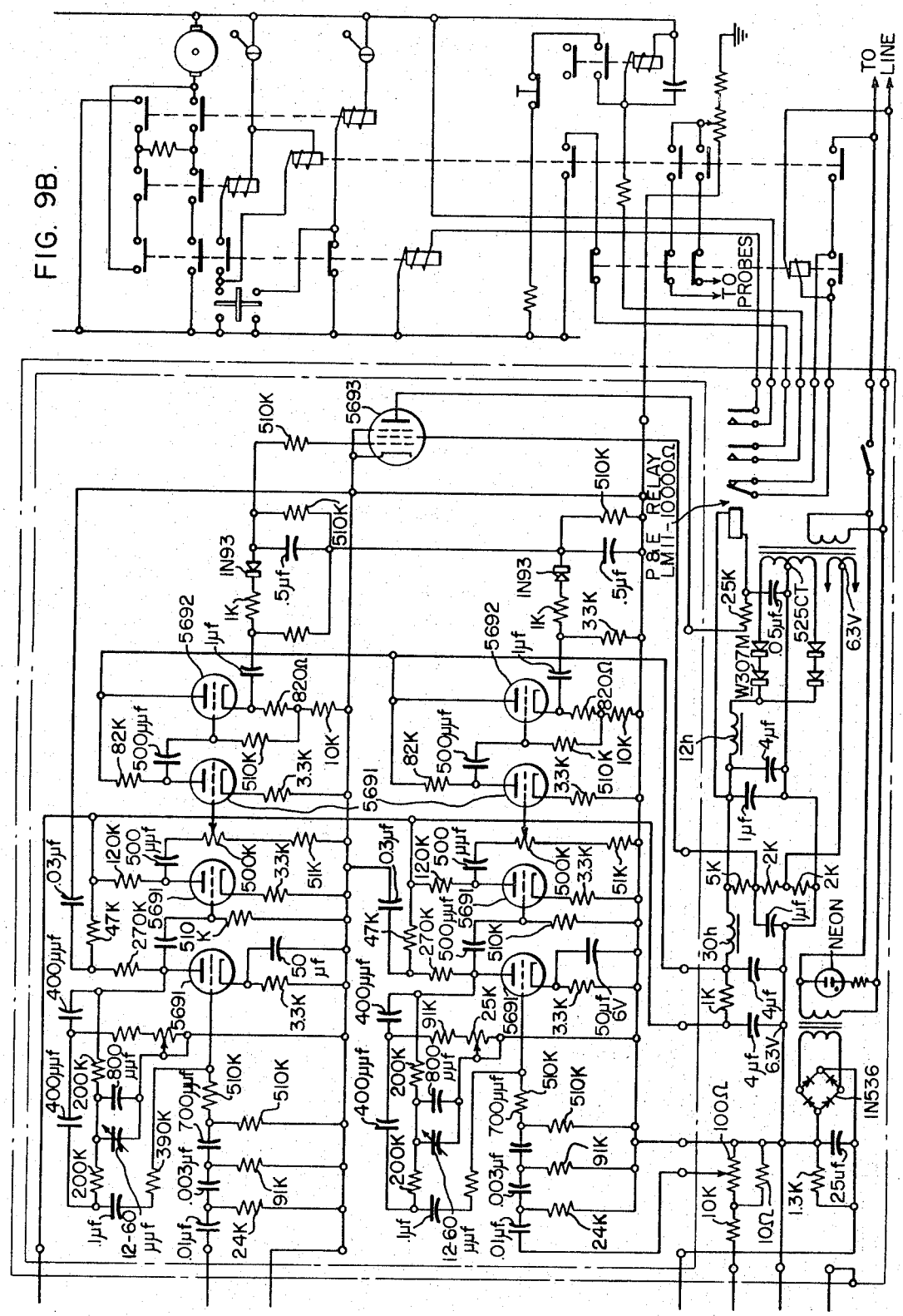

3,370,677
PROXIMITY SENSING APPARATUS AND
SENSOR THEREFOR
Edward F. Federmann and Richard W. Stoeltzing, Pittsburgh, Pa., assignors to Westinghouse Electric Corporation, Pittsburgh, Pa., a corporation of Pennsylvania
Filed Jan. 12, 1966, Ser. No. 520,119
18 Claims. (Cl. 187—48)

ABSTRACT OF THE DISCLOSURE

Field generator projects a field beyond the leading edge of a door during closure which is shaped to confine it essentially to a critical projection area. The resultant of field conditions for two doors controls stopping or reopening of the doors. Phase relations and sensitivity of the two fields are altered as the doors near closed condition. System operativeness is tested. For dual doors, the outer door is slightly retracted during part of closure.

---

This invention relates to the art of producing corrective response to the proximity of objects to predetermined parts of apparatus or structures and in its most general aspects is applicable to perimeter detectors, burglar alarms, protective devices for heavy machinery and the like. In its specific aspects this invention concerns itself with producing responses to the proximity of an object or person to the moving door panels both of the hoistway and the cab in the entrance of an elevator.

Proximity-responsive apparatus includes a sensor which senses the proximity of the person or object to be detected. In the case of an elevator installation it is necessary that the sensor shall operate to cause the proximity apparatus to operate only when the moving panels are so near to a person or object that they are likely to strike this person or object, and not merely when the person or object is in the entrance; it is desirable that the closure of the doors shall not be delayed by people or bodies in the entrance remote from the doors. It is also necessary that the proximity-response apparatus shall not be operated by the presence of people or objects in the approaches to the hoistway doors near the elevator or by the people or objects within the cab even while such people or objects are near the sensor.

In accordance with the teachings of the prior art the sensor for proximity apparatus for elevator installations is a flat plate along the outer edge of each movable door panel of the cab. An alternating potential is impressed on this plate and the proximity of a person or an object to the movable door panels is detected by the effect on this potential of changes in the capacitance, with reference to ground of the plate, introduced by this person or object. It has been recognized that an apparatus of this type the capacitance to ground of the sensor changes as a result changes in the spacing between the cab doors or other parts of the installation, such as the walls of the hoistway and the doors of the hoistway. In accordance with the teachings of the prior art complex arrays of plates have been provided to compensate for these changes.

The apparatus in accordance with the teachings of the prior art has not met the above requirements as to the definitiveness of the proximity-response region with the sharpness, constancy and reliability that is demanded in modern elevator installations. The compensating array introduces complexity into the apparatus. It has been observed that this apparatus fails to operate properly.

It is an object of this invention to overcome these disadvantages of the prior art apparatus and to provide an elevator installation having a reliable door proximity-response apparatus which shall meet the above requirements and require a minimum of servicing and shall operate positively in response to the proximity of an object or a person within a relatively sharply defined volume in the vicinity of the moving panels of the doors of an elevator installation but shall not respond to changes resulting from differences in the geometry of the landing or capacity produced by the movement of the panels or by people or objects near the panels within the cab or people or objects near the landings of the installation. Another object of this invention is to provide a sensor uniquely adapted to meet the above listed requirements of an elevator installation but having applicability to apparatus of other types.

In the practice of this invention the closure of the entrance of the cab of an elevator installation is provided with a directional sensor of the type which manifests an electrical impedance such as a capacitance that is varied appreciably by the presence of a person or object in a selected volume. The closure of an elevator entrance may be single-speed or two-speed center opening in which the closing is effected by the approach to each other of panels moving in opposite directions, or they may be side opening in which the closing is effected by the approach of a movable panel towards a jamb. In either case, a sensor is disposed along each vertical edge bounding the narrowing entrance to the cab. For convenience, it will be assumed that the doors are of the center opening type; a sensor is disposed on the edge of each of the moving panels which approach each other.

Specifically, each sensor is of the capacitive type including a conductor on which a potential is impressed and which is constructed and positioned to have a defined directional capacitive effect. The presence of an object or person in a selective directional volume proximate to the door panels of the cab and of the hoistway results in a change in this capacitance either by reason of the electrical conductivity of the proximity object or person or by reason of the difference between the dielectric constant of the person or object and of the air.

In accordance with this invention each panel of the entrance of the cab is provided with a conductor concaved in the direction generally inwardly towards the cab which conductor is in turn partially surrounded by a conducting channel or shield. The concave conductor and shield are electrically displaced from ground; in addition a grounded conductor extends along one side of each shield outside of the shield. Alternating potential, preferably of a frequency substantially greater than commercial frequency, is impressed between each concave conductor and each shield and the amplitude of this potential is varied in dependence upon the varying capacitance of the conductors with respect to ground in response to objects or persons in proximity to the panels. This variation is a function of the distance and geometry of the person or object whose presence is to be detected near the panel. The sensitivity of the proximity-response apparatus is the lowest change in capacitance for which the panels are caused to reverse their direction and move away from the proximate object or person.

To evaluate the reponse of this apparatus it may be assumed that from each concave conductor a family of three dimensional lobes extends. Each lobe of the family defines volume having a boundary whose penetration in any region by a part of an object or a person of the same geometry produces an equal change in the capacitance to ground of the conductor. The nearer this lobe to the conductor on a panel the greater the change in capacitance produced by the same volume or person or object.

Each concave conductor is, in the practice of this invention, connected to a preamplifier mounted on the panel immediately adjacent the conductor. The vectorial sum of the output of these preamplifiers is impressed on a detector unit which is connected to control the panel drive. The sensitivities of the preamplifiers and the detector may be so set that the apparatus responds to penetration of the boundary of a selected lobe near the door. This lobe may be called the response lobe. By reason of the concavity of the concave conductor and of the effect of the grounded conductor, the responsive lobe has substantially a directivity extending around the outer edge of the panel of the cab and the outer edge of the panel of the adjacent door of the hoistway, but not penetrating appreciably into the cab or beyond the door in the hoistway. Principally the grounded conductor is mounted so as to direct the lobe away from the hoistway panel so as to suppress the effect of the relative motion of the hoistway panels. In addition the hoistway panels may be retracted a short distance of the order of about one inch, behind the corresponding position of the cab panels. In this case the hoistway panels must be moved so that they are aligned with the cab panels near the closed positions. This tends to counteract the effect of the approaching cab panels.

In accordance with an aspect of this invention each sensor is connected across the equal potential terminals of a balanced network. This network includes as one of its electrical components the capacity of the sensor to ground which is varied by the person or object whose proximity is detected. The potential across the network is so balanced that the potential across the sensor in the absence of a proximate person or object is zero, appreciable potential appears across the sensor only when the proximate person or object is present. Thus, changes in the sensor which may take place by reason of aging or for other reasons do not affect the response of the apparatus.

Under the requirements of the elevator code a sensor of the type involved in the practice of this invention must be encapsulated for aesthetic appeal and for the protection of people using the elevators. In accordance with a further aspect of this invention, the encapsulation of the sensor is such that it is not affected by changes in humidity or temperatures.

A further aspect of this invention arises from the realization that a person or object passing through the entrance of an elevator door penetrates the lobes of the sensors on each side of the entrance. The effect produced by this penetration is dependent on the sum of the changes in capacity produced by the person or object. If these effects were arithmetically added, the control apparatus would respond when the person or object penetrates lobes corresponding to a lower sensitivity than that of the selected responsive lobes. In accordance with a further aspect of this invention the potentials impressed between the concave conductor and the shield of each sensor are displaced in phase and their proximity responses are algebraically added. Specifically, the potentials may be displaced in phase by 120°; in this case the algebraic sum of equal responses would produce a magnitude substantially equal to that of the separate responses. The door operating apparatus would then respond only to the penetration of lobes corresponding to the selected sensitivity and a person or object entering the elevator when the panels are fully opened would not reverse the movement of the panels.

In accordance with a further aspect of this invention the potentials impressed on the opposite sensors may be in opposite phase. Response to proximity would fail to be produced in this case in the contingency that the selected response lobes are penetrated equally by the object or person in the entrance. This is a highly improbable or virtually impossible eventuality.

In the practice of this invention shielding conductors and the concave conductor are mounted to extend along the outer edges of the panels to a sufficient length to cover the region in which an object or a person might be present between the moving panels. The grounded conductor on the outside of the channel conductor is also elongated and disposed along the edges of the panels as just described.

In the use of the apparatus according to this invention the response lobes of the sensors approach each other as the doors are closed. Because of this movement the outer edge of each panel ultimately penetrates the response lobe of the opposite panel. To prevent actuation of the door-operating equipment under such circumstances provisions are made to reduce the sensitivity of the sensors as the panels approach the closed position and ultimately to deactivate the sensors entirely as the panels reach the closed position. For this purpose a plurality of switches are interposed along the path of the panels and are progressively operated as the panels approach the closed position. Typically, the first switch to be operated may reduce the sensitivity of the apparatus, the second switch may shift the phase of the potentials impressed on the opposite sensors from 120° to 180°, and the third switch may reduce the sensitivity of the apparatus to zero so that the closing mechanism is not affected by the sensors.

In accordance with a further aspect of this invention the apparatus includes a probe for checking whether or not the entire sensing apparatus is operating properly. This probe is actuated, simultaneously with the door closing relay when the door controlling mechanism or pushbutton is operated, temporarily to impress a potential between each probe and each concave conductor. The effect of this potential is similar to the effect of a person or object in the response lobe of the sensor. After this effect has produced a proper response the probe is disconnected and the apparatus operates normally. If the system is not in proper operating condition, an indicator is energized.

For a better understanding of this invention, both as to its organization and as to its method of operation, together with additional objects and advantages thereof, reference is made to the following description taken in connection with the accompanying drawings, in which:

FIGURE 1 is a view in perspective showing the pertinent portions of the entrance of an elevator at a landing of an elevator installation which embodies this invention;

FIGS. 8A and 8B are schematics of a circuit in accordance with this invention;

FIGS. 9A and 9B are schematics similar to FIG. 8 but showing the magnitudes and components of such a circuit which was used and found to operate satisfactorily.

FIG. 9 is included herein for the purpose of aiding those skilled in the art in practicing this invention and not with any intention of in any way restricting the scope thereof.

Figure 8A:
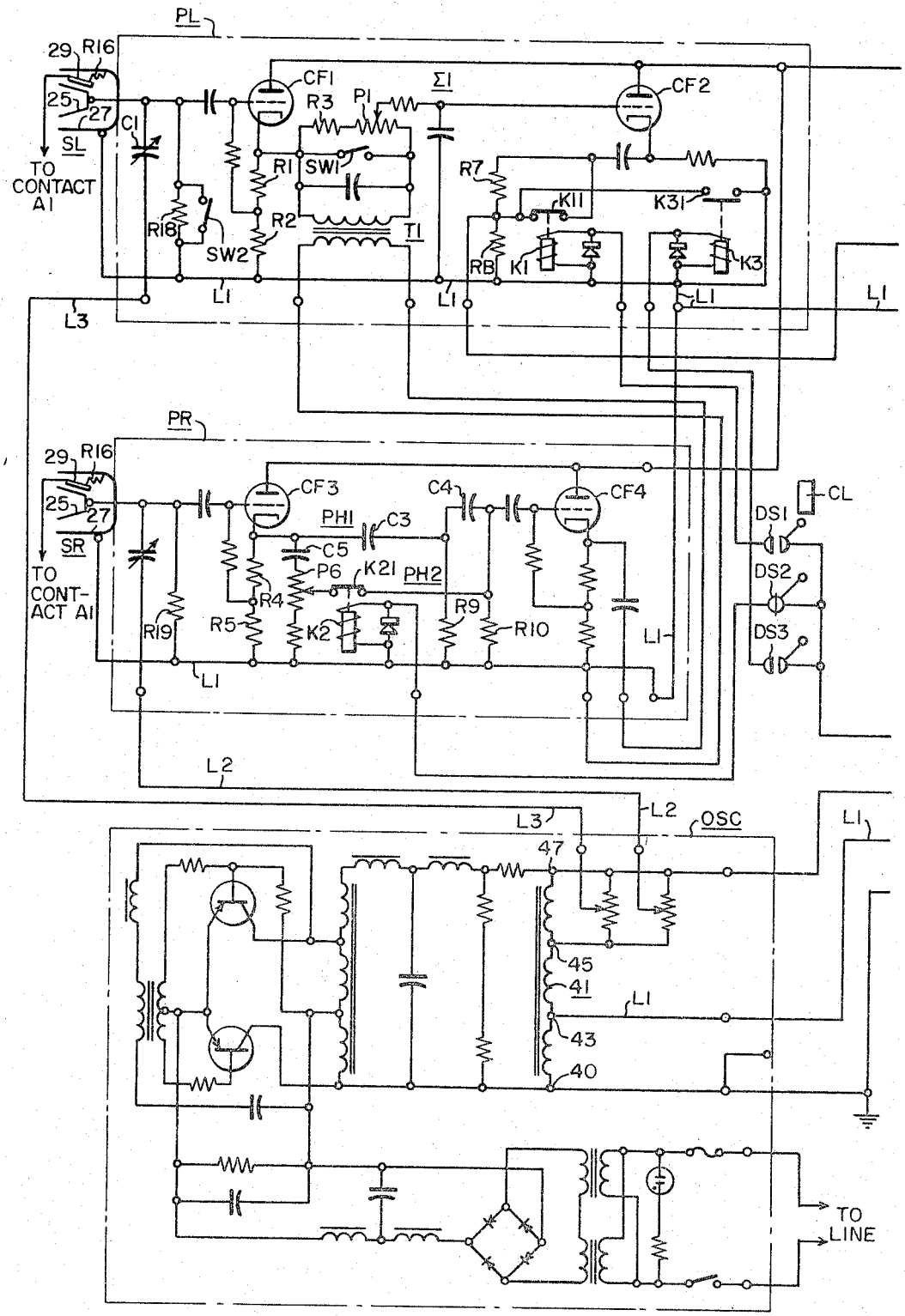

In FIG. 1 is shown a portion of an elevator installation in which the doors are of the single-speed center-opening type. This portion includes a cab 21 which is represented as stopped at a station with its doors open. The cab door has movable panels CL and CR on the left and right which are separated. The hoistway has corresponding panels HL and HR which are separated. The panels are operated to open and reclose by motor MO (FIGS. 8A and 8B) through suitable driving mechanisms such as linkages and chain belts (not shown). The cab panels CL and CR are coupled to the hoistway panels HL and HR so that the cab panels and the hoistway panels move together. (This coupling is not shown.)

Figure 2:
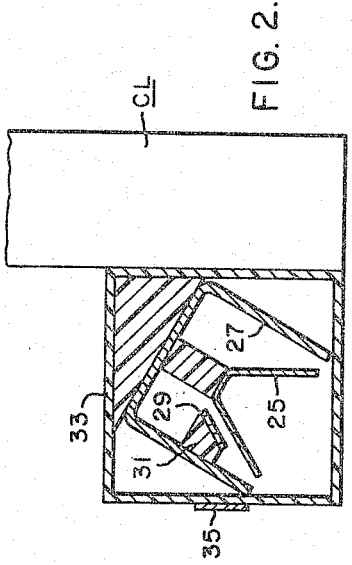
FIG. 2 is a view in section taken along line II—II of FIG. 1.

Each panel CL and CR carries at its outer end a capacitive sensor SL and SR respectively. Each sensor SL and SR includes an elongated concave conductor 25 concaved inwardly (away from the hoistway entrance) with respect to the panel CL and CR. The conductor 25 is mounted in an elongated channel shaped conductor or shield 27 but insulated from this shield 27 (FIG. 2). A small test probe 29 is mounted on an insulator 31 extending from the shield 27. The test probe 29 is a conducting plate, mounted adjacent the concave conductor 25. For the protection of the people using the elevator installation and also for aesthetic reasons the sensors SL and SR, including the concave conductor 25, the channel conductor 27 and the probe 29, are encapsulated in a generally rectangular container 33 or may be potted in an insulating material. In accordance with this invention the container or the potting compound should be such that it is not affected by changes in temperature or changes in humidity. A suitable encapsulation compound is an epoxy resin typically No. 2 Hysol 6232 sold by Haughton Laboratories, Inc., of 322 Haughton Ave., Olean, N.Y. On the outside of the container 33 there is an elongated conductor 35 which is grounded. The channel 27, the concave conductor 25 and the elongated grounded conductor 35 extend along the length of each panel SL and SR over a sufficient extent to cover the region in which an object or a person 39 might be penetrating through the cab entrance. A box PL and PR containing a preamplifier is mounted on each container 33 near the associated sensor and the input of the preamplifier within the box PL and PR is in direct communication with the output of the associated sensor SL and SR.

As the panel CL moves towards the closed position it actuates switches DS1, DS2 and DS3 (FIG. 8). Switches DS1 and DS3 are opened in the unactuated position and are closed when actuated by the panel. Switch DS2 is closed in the unactuated position and is opened when actuated by the door. These switches are so arranged that they are progressively actuated as the panel CL approaches its closed position so as to suppress the operation of the door mechanism responsive to the sensors SL and SR by the capacity changes produced by the panels therealong. Switch DS1 operates to reduce the sensitivity of the door operating apparatus as the moving panels SL and SR approach. Switch DS2 operates to shift the phase displacement derived from the alternating potentials impressed on the sensors SL and SR from 120° to 180° and switch DS3 desensitizes the door control apparatus altogether so that the door control apparatus would entirely fail to operate to reverse the movement of the panels. Switch DS3 is actuated when the panels are very near to being closed.

Each sensor SL and SR has a capacitance to ground which may be varied by the proximity of a person or object. This variation in capacitance is given an electrical effect by impressing a potential between the shield 27 and the concave conductor 25 of each sensor. Preferably the frequency of this potential should be substantially higher than commercial frequency. This potential is derivable from an oscillator OSC (FIGS. 3 and 8) which produces an output at a frequency of about 2000 cycles per second.

Figure 4:
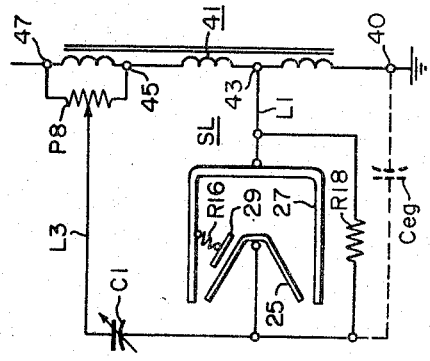
FIG. 4 is a fragmental schematic of a portion of FIG. 3 showing the balanced network in which a sensor is connected.

The oscillator OSC is provided with a tapped inductor 41 from which the potential for the sensors is derived. One terminal 40 of this inductor 41 is grounded; a fixed and variable resistor R15 and P11 respectively are connected across terminals 43 and 47 of the inductor 41. The potential for the sensors SL and SR is derivable from conductors L1, L2, L3 connected to the latter terminals 43 and 47 and intermediate terminal 45. Conductor L1, which is of lower potential (and is a common conductor in the system), is connected to the shields 27; conductors L2 and L3 extend respectively to trimming variable resistors P7 and P8 which are connected in between terminals 45 and 47. Conductor L3 is connected to the concave conductor of SL through variable capacitor C1 and L2 is connected to SR through variable capacitor C2. A resistor R18 and R19 respectively is connected between each concave conductor 25 and each shield of each sensor SL and SR. Each sensor SL and SR is thus connected in a balanced network as shown in FIG. 4. The potential for this network appears across the tapped inductor 41. The tap 43 of the inductor is connected to the shield 27 and the terminals 45–47 of the inductor 41 is connected to the concave conductor 25 through the variable capacitor C1 and C2 and trimming resistors P7 and P8. The concave conductor 25 may be regarded as connected to the grounded terminal of the tapped inductor 41 through the capacitance to ground $C_{eg}$ of the sensor. Each variable capacitor C1 and C2 is set so that the potential across the sensor with no person or object proximate to the sensor is zero.

Each probe 29 is connected to the associated shield 27 through a resistor R16 and is also adapted to be connected to ground through an associated back contact A1 of relay A and an associated front contact D1 of relay D and through a variable and a fixed resistor P15 and R17 respectively. When relay D is in the actuated condition each probe 29 has a potential impressed on it which is close to the potential on the shield 27, the exact value depending on the adjustment of the variable resistor P15.

The left-hand preamplifier PL includes two cathode followers CF1 and CF2 between which an electrical summation component Σ1 is interposed. The right-hand preamplifier PR includes a pair of cathode followers CF3 and CF4 between which phase shifting networks PH1 and PH2 are selectively connected. With the panel CL in the fully open position the phase-shift network PH1 is set to produce a phase-shift of 180° between the potential from the left sensor SL and the potential from the right sensor. Phase shift network PH2 is set to introduce a difference of phase of 120°. In the fully open position of the cab door the network PH2 is connected between CF3 and CF4 and in the nearly closed position the network PH1 is connected between CF3 and CF4. The output of cathode followers CF1 and CSF4 are connected to the summation network Σ1. At its output the network Σ1 produces a potential which is equal to the vectorial sum of the potentials of CF1 and CFW4. The output of CF2 is controlled by the sensitivity switch mechanism SS including DS1 and DS3. This output is supplied to a detector DR in which the output signal from CF2 is compared to a bias signal derived from the variable resistor P11 connected across the terminals 43 and 47 of the inductor 41.

Figure 3:
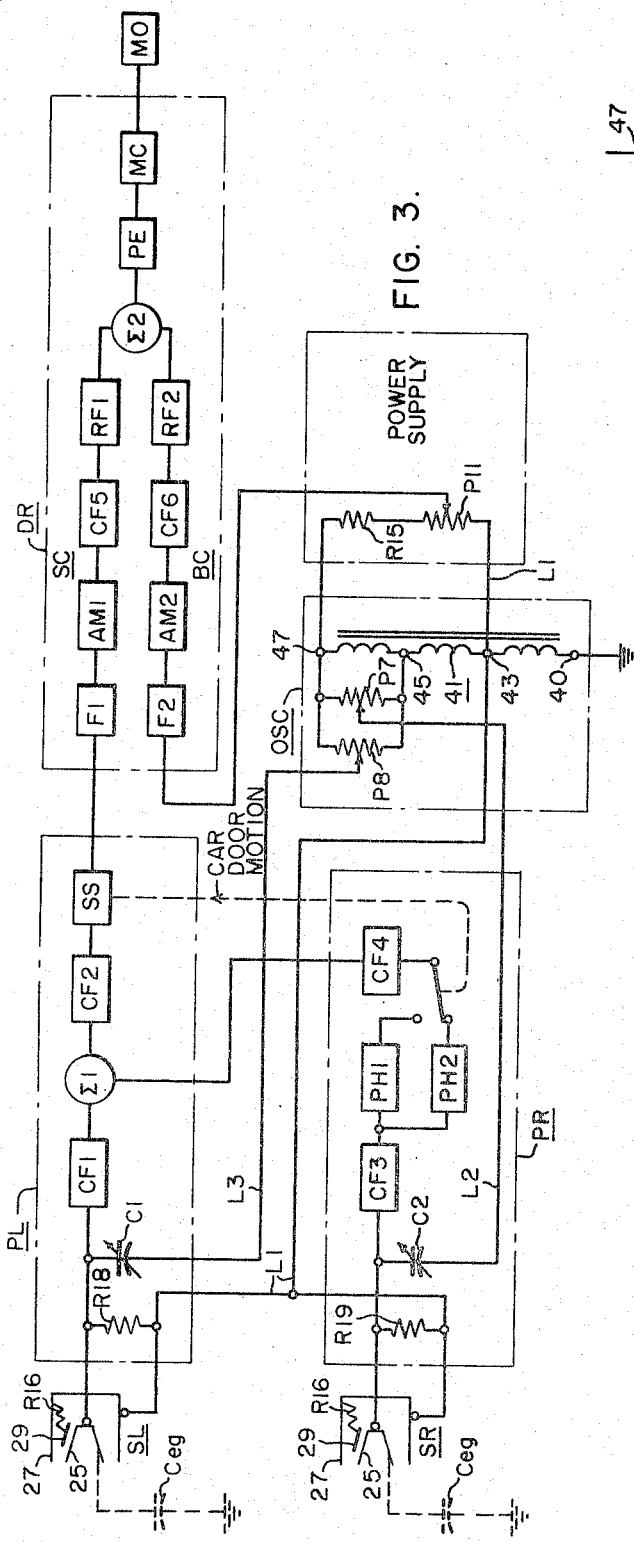
FIG. 3 is a block diagram showing the important features of this invention in their electrical relationships.
Figure 9A:
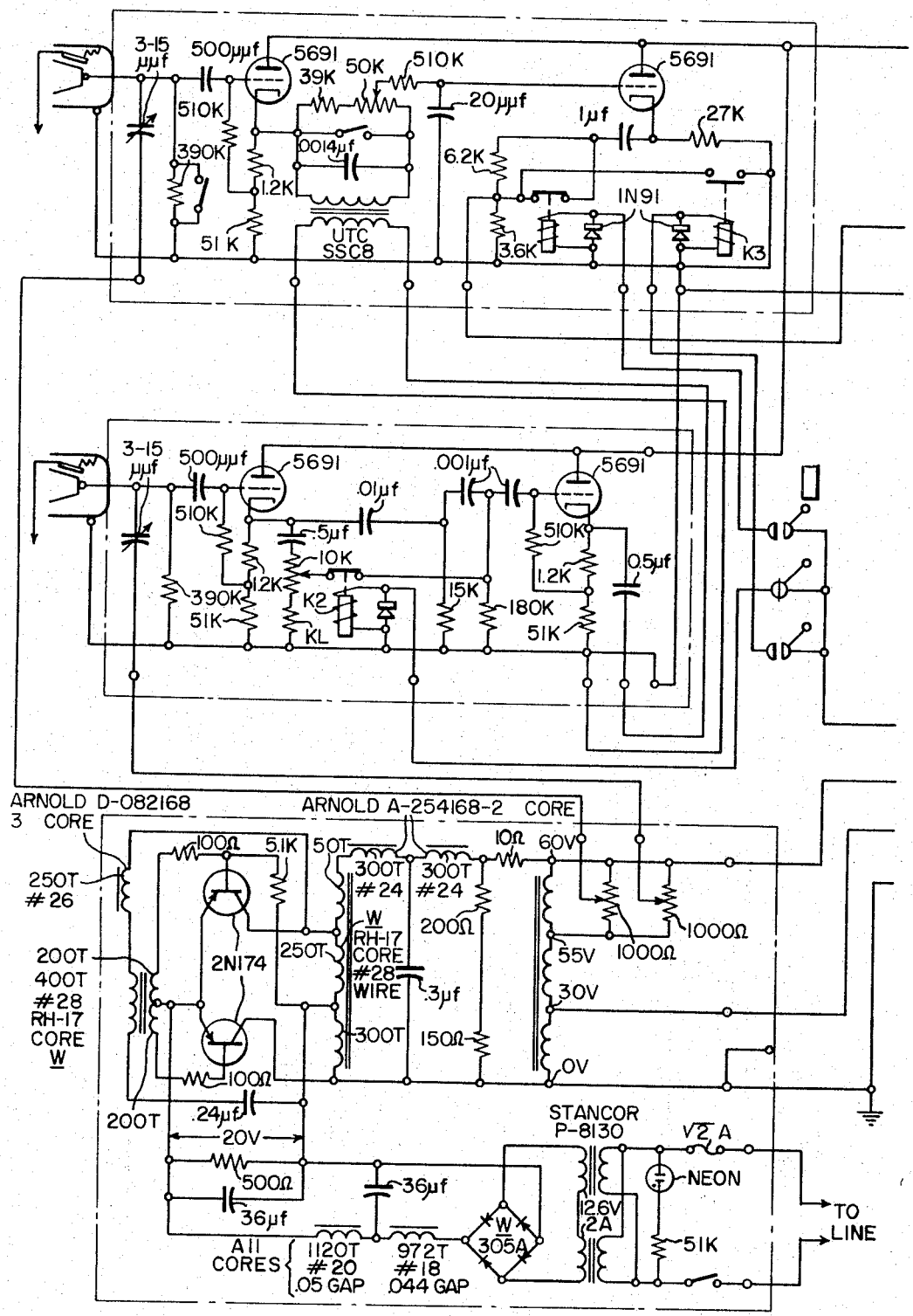

There are alternatives to the phase-shift circuit disclosed in FIGS. 3, 8 and 9. For example, a phase shifter may be interposed in the conductor from the oscillator OSC to one of the sensors to provide the phase displacement directly between the potentials on the sensors.

The detector DR has a signal channel SC and a bias channel BC. The output of CF2 is supplied to a filter F1 in the signal channel SC of detector DR which is set to pass signals only of the frequency of oscillator OSC, typically 2000 cycles per second. The output of the filter F1 is supplied to a two stage amplifier AM1. The output of the amplifier AM1 is supplied to a cathode follower CF5 the output of which is rectified and filtered to produce a direct-current potential proportional to the signal received from the sensors SL and SR. The output of the rectifying filter is supplied to a summation device Σ2. The direct-current signal thus derived is compared with a bias signal supplied through the bias channel BC which is derived from the oscillator OSC, through a filter F2, similar to F1, through an amplifier AM2 similar to AM1, a cathode follower CF6 similar to CF5, and a rectifier RF2 into the summation device Σ2. Σ2 produces a signal equal to the difference of the direct-current potentials impressed on it. This signal is impressed in the control circuit of a pentode PE which operates as a switch. The pentode PE is biased to operate fully conducting in the absence of a signal from Σ2 and to become non-conducting when a signal from Σ2 of a magnitude selected to produce operation of the door is impressed in its control circuit. The output of the pentode PE is supplied to a relay O which is connected to operate the door control motor MO.

The sensitivity of the sensors SL and SR depends essentially on the potential for which the pentode PE is set to swing from the fully conducting to the fully non-conducting condition. This potential may be set by setting the bias impressed on the summation device Σ2 through the bias channel and this setting is in turn dependent on the setting of the variable resistor P11 which is connected in series with a fixed resistor R15 across the inductor 41.

Figure 5:
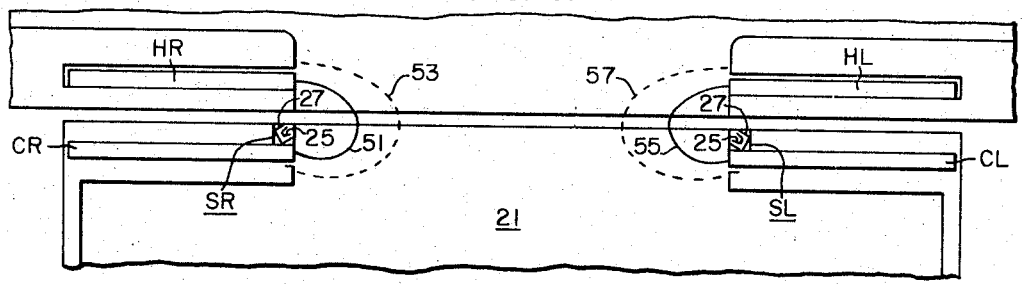
FIGS. 5, 6 and 7 are generally diagrammatic views showing the relationship of the sensor lobes to a person in the entrance of an elevator cab.
Figure 6:
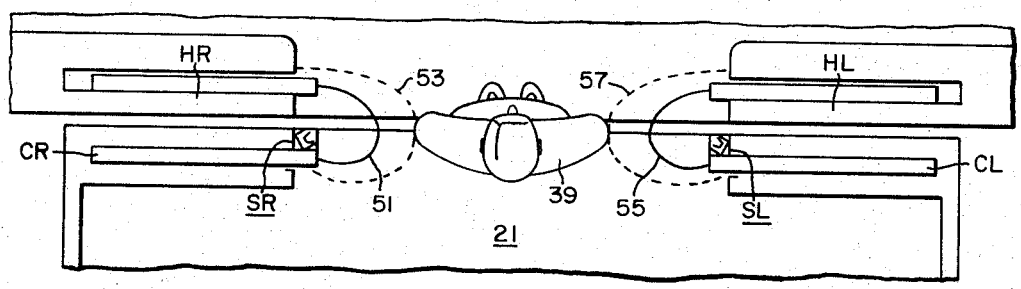
Figure 7:
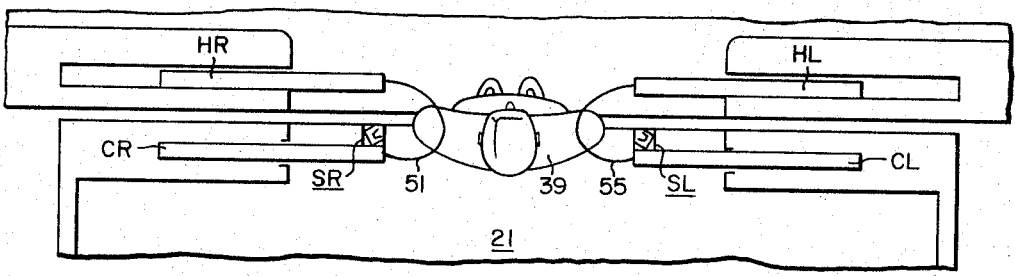

The sensitivity may be evaluated in terms of a family of three dimensional lobes which may be plotted about each of the sensors SL and SR. In FIGS. 5 through 7 two such lobes 51 and 53 and 55 and 57 are shown for each sensor SL and SR, one lobe each 51 and 55 in full lines and one lobe each 53 and 57 in broken lines. The lobes 51 and 55 correspond to a setting of the bias channel for which reverse operation of the panels CL and CR and HL and HR takes place. The lobes 51 and 55 define a boundary which if penetrated by a person or object would cause the pentode PE to swing to the non-conducting condition. The full line lobes 51 and 55 are confined to the regions near to the car door panel and the hoistway door panel but do not extend substantially out into the regions beyond the hoistway opening or into the cab C. This directional effect of the lobe is achieved by the concavity of the conductor 25 and the effect of the grounded conductor 35 adjacent the outside of the channel conductor or the shield 27. The broken line lobes 53 and 57 define volumes, the penetration of which produces a signal equal to half the signal produced by penetrating the full-line lobes.

Figure 10:
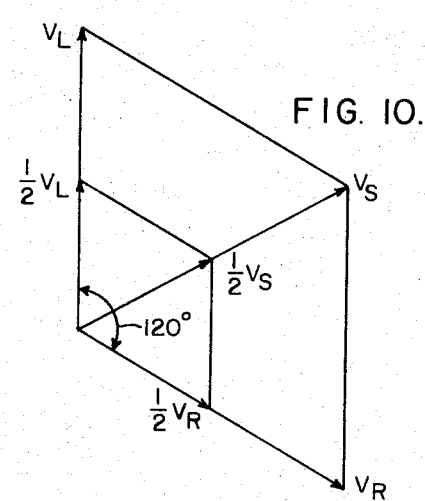
FIG. 10 is a vector diagram illustrating the operation of the apparatus according to this invention.

The operation of the apparatus is illustrated in FIG. 10. In this view $V_L$ is the vector representing the signal produced by penetration of a person or an object through the boundary of the full line lobe 55 of the sensor SL. $V_R$ is the corresponding vector produced for the sensor SR. The amplitudes of $V_L$ and $V_R$ are shown substantially equal assuming that the penetration in each case is to the same extent. This amplitude is adequate to cause the pentode PE to swing from a conducting to a non-conducting condition and to cause the door to reopen. The vector sum $V_S$ of $V_L$ plus $V_R$ is of substantially the same amplitude as $V_L$ or $V_R$ and would also cause operation of the pentode PE. The vector $\frac{1}{2}V_L$ represents the signal which would be produced by penetration of the boundary of the broken-line lobe 57 of the sensor SL; $\frac{1}{2}V_R$ the same signal for the sensor SR. If both lobes are penetrated as shown in FIG. 6 a signal would be produced at the output of the summation device Σ1 which would be equal to the vectorial sum, $\frac{1}{2}V_L + \frac{1}{2}V_R$ or $\frac{1}{2}V_S$. This has the same amplitude as either $\frac{1}{2}V_L$ or $\frac{1}{2}V_R$. Since a signal of the amplitude $V_L$, $V_R$ or $V_S$ is required to operate the pentode PE the total signal produced by a person as shown in FIG. 6 would not be adequate to reverse the panels CL and CR and HL and HR to reopen and the doors in FIG. 6 would continue to close in spite of the presence of a person penetrating the broken line lobes 53 and 57.

In accordance with an alternative aspect of this invention the phase displacement between the alternating potential of the sensor SL and the alternating potential of the sensor SR may be displaced by 180°. The addition of the signals resulting from such a displacement might result in failure of the doors to reopen in a situation as illustrated in FIG. 7 where the person penetrates both full line lobes 51 and 55 equally. But this is a highly unlikely condition. People and objects are not so symmetric that they would penetrate the full line lobes equally under any conditions. If the 180° phase difference is incorporated in the apparatus, the phase displacement of the potential on one of the probes 29 should be reversed with respect to the potential on the other so that the total signal derived from the probes are the arithmetic sum of the separate signals.

The circuit for apparatus according to this invention is shown in detail in FIGS. 8 and 9. The output from cathode follower CF1 is derived from resistors R1 and R2 connected to the cathode of CF1. This output is impressed on the summation network Σ1 which includes resistor R3 and variable resistor P1. The output from cathode follower CF3 is derived from resistors R4 and R5 through the network including capacitor C3 and resistor R9 and capacitor C4 and resistor R10 and is impressed through cathode follower CF4 and transformer T1 on the summation network Σ1. Each of these networks introduces a phase displacement of the order of about 30° in the signal derived from the cathode followers CF3. These networks constitute the phase-shift network PH2. The total displacement introduced by these networks is 60° which when subtracted from 180° introduced by transformer T1 constitutes a 120° phase displacement. The conversion from 120° to 180° is controlled by relay K2 which is controlled by the door switch DS2. Switch DS2 is closed when the panel CL is open and is opened by closing the panel. Relay K2 has a back contact K21 which is open with DS2 closed. Under such circumstances a network including capacitor C5 and variable resistor P6 are disconnected from the output of cathode follower CF3. When the door switch DS2 is opened by the door, K21 is reclosed connecting the C5–P6 to the output of CF3. With C5–P6 connected the phase displacement between the potential from SL and that from SR is 180°.

The output of cathode follower CF2 is derived from the junction of resistors R7 and R8. Resistor R7 is shunted by back contact K11 of relay K1 which is controlled by the door switch DS1, resistor R8 is shunted by front contact K31 of relay K3 which is controlled by door switch DS3. Door switches DS1 and DS3 are open with the panel CL open. Normally R7 is not connected in the output circuit of cathode follower CF2. As the panel CL approaches the closed position DS1 is closed actuating relay K1 and opening contact K11. This has the effect of reducing the sensitivity of the apparatus by reducing the output signal derived across resistor R8. When the panel CL approaches the fully closed position, DS3 is closed actuating K3 and closing K31 which reduces the sensitivity of the apparatus substantially to zero. The progressive reduction in the sensitivity of the sensors is thus effected first by reducing the sensitivity of the cathode follower CF2, then by shifting the difference in phase between the potentials derived from the sensor SL and the sensor SR, and finally by reducing the sensitivity of the appparatus to zero.

The amplifiers AM1 and AM2 of the detector DR are of the feedback cascaded type. The input stage of each amplifier AM1 and AM2 includes a bridged T-feedback network FB1 and FB2 respectively. These networks tend to enhance the signal frequency generated by OSC, and filters F1 and F2 respectively tend to attenuate the inputs of frequencies lower than the frequency of OSC. As a result the amplifier responds primarily to the frequency of OSC and is unlikely to accept extraneous electrical noise. The control for the bias channel is derived from variable resistor P11 and the magnitude of the potential derived from P11 may be adjusted to set the sensitivity of the apparatus. The function of the complete bias channel is to counteract voltage or component changes in the signal channel. The summation network Σ2 includes the conductors connecting the output of the rectifier-filter RF1 to the control grid of the pentode PE and the output of the rectifier filter RF2 to the other terminal of RF1. These outputs are subtracted and applied to pentode PE.

The output of PE controls a motor control circuit MC including the relay O which is actuated by the pentode PE and is normally in actuated condition because the pentode PE is normally conducting. The relay O has front contacts O1 and O2 which are closed in the standby condition of the apparatus and back contact O3 which is open in the standby condition. The motor-control circuit MC also includes a switch SW which may be the contact of a relay and which is operated to open or close the doors of the elevator at the landing. The switch SW has a closed position CO and an open position ON. The motor-control circuit also includes a relay CL which is actuated to energize the motor MO to close the doors and a relay OP which is energized to open the doors of the elevator installation. The motor control circuit also includes the relay DR which is actuable responsive to the relay O. It also includes the relay D whose coil is adapted to be connected in parallel with the coil of CL through contact DR3, and also the auxiliary relay A. CL and D are energized simultaneously if DR3 is closed but on such energiziation D operates before CL. The relay A may be energized from the alternating potential supply or from L1 and L2; the other relays are energized from a suitable direct current supply derived from conductors L+ and L—.

In the standby condition of the motor control circuit MC the relay O being energized, contact O1 is closed. The coil of relay DR is connected between conductors L+ and L— through the contact O1 and this relay is actuated. Relay DR has front contacts, DR1, DR2 and DR3 and back contacts DR4. The front contacts are closed in the standby condition of the apparatus and DR4 is open. The energizing circuit for the coil of the relay OP through limit switch 153 is open at DR4 and also at SW. The contact DR3 is closed and in this position prepares a circuit through the switch SW to energize the door closing relay CL through limit switch 151. The coil of the relay D is connected in parallel with the coil of the relay CL and DR3 and is energized with CL. The coil of the relay A is adapted to be connected to the supply conductors L5 and L6 or L+ and L— through back contact O3. This contact is open with PE energized so that the relay A is deenergized.

To open the doors at a landing the switch SW is instantaneously moved to position ON energizing relay OP. OP is then actuated and a circuit is closed through the motor MO as follows: L+, OP1, field 23F, OP2, armature 23A, L—. The doors are then opened. When the panels are fully retracted limit switch 153 is opened deenergizing the motor MO and resetting the doors for closing. When the doors are to be closed the switch SW is moved to position CO and relay CL is energized in the following circuit: L+, SW, DR3, CL, 151, L—. Relay D is also energized. With relay CL energized the following circuit through the motor MO is closed. L+, DR2, CL2, 23F, CL1, DR1, 23A, L—. On the closing of switches SW at CO relay D is also energized but operates before CL preparing the circuit for relay A through D3 and also applying potential between the probes and the concave conductors 25 through contacts D1 and contacts A1. The energization of relay D closes contact D2 and D2 conditions circuits L+, D2, A3, O2, resistor R15, capacitor C10, L— to charge C10.

If the proximity system is in proper operation, relay O is deenergized and contact O1 is momentarily opened deenergizing relay DR and for the time being preventing energization of the motor MO. But when relay O is deenergized contact O3 closes energizing relay A and this relay is locked in independently of D3 through contact A2, so long as O3 remains closed. Relays A and O must be so related that A2 closes before O3 opens, hence A2 should close before A1 opens. With relay A energized contacts A1 are opened removing the potential between the probes and the concave conductors and causing the relay O to be renergized unless either of the sensitive lobes 51 or 55 is penetrated by a person or object. In the absence of such penetration the relay CL is energized through contact DR3 which is now reclosed. It is assumed that the switch SW remains closed at CO long enough to pass through the transitional operation of relay D.

With CL energized the motor is energized in the following circuit: L+, DR3, CL2, 23F, CO1, DR1, 23A, L—. The motor now starts to reclose the doors. If a person or object intercepts the boundary of the sensitive lobe 51 or 55 in any position of the door the relay O is deenergized opening contact O1, deenergizing relay DR. Relay DR drops out opening the circuit through the motor MO, DR1 and DR2 and energizing relay OP at reclosed back contact DR4. At this point the limit switch 153 has reclosed since the doors have moved away from the fully closed position. The motor is then reversed, reversing the movement of the doors. This continues until the penetration of the sensitive lobe is interrupted and then the relay DR is deenergized and the motor MO energized to continue the closing the doors.

If the system is not in proper operating condition relay O remains energized when the probes 29 are energized through D. Capacitor C10 is then charged through O2 and A3. The charging of capacitor C10 continues so long as relay O remains deenergized and O2 and D2 remains closed. If the system is not operating properly C10 is charged in a time interval determined by C10 and R15 to operate relay L causing a visual or audio signal to be produced through contact L10. The circuit R15, C10 has so long a time constant that relay L does not become actuated during the tmporary operation initiated by the impressing of a potential between the probes 29 and the concave conductors 25 and the actuation of relay O. The relay L is locked in through contact L20 and may be reset by a pushbutton SW3, once the operator is informed of the failure in the operation of the proximity apparatus.

In the case of an elevator installation it is desirable that the improper operation of the proximity system be signalled as disclosed. But where this invention is applied to protect against proximity to a press or the like, it is desirable that the actuating or closing mechanism for the press be disabled.

An important feature in the operation of the probes 29 is that they may be set to check sensitivity as well as gross operation. The potential impressed on the probes is set by variable resistor P15 and this resistor may be adjusted to provide a potential between the probes 29 and the concave conductors 25 corresponding to the desired sensitivity of the apparatus. For example, assume that the apparatus is set to operate for a 12 millivolt signal introduced by a person or object penetrating the boundary of the sensitive lobe 51 or 55. Typically, the variable resistor P15 may be set to inject a 14 millivolt signal into the preamplifiers PL and PR. Operation of the apparatus for the 14 millivolt signal is an indication that the gross operation of the apparatus is proper and also that the sensitivity is within the general range of the desired sensitivity. If the apparatus fails to operate there may be a defect in the overall system or the sensitivity may have decreased. The appropriate adjustment may then be made.

The following summary may aid in the understanding of the invention.

This invention is directed toward the protection of elevator passengers against the possibility of being struck by closing elevator panels CL, CR or HL, HR. It has been proposed to provide such protection with a capacitance between sensors SL, SR and ground which serves to sense the presence of a person. Prior art devices of this type have not operated satisfactorily.

A study of this prior art apparatus has revealed that consideration must be given to the following environmental conditions and protection circumstances:

(1) The effects of motion of the hatch or hoistway panels HL and HR relative to the cab, panels CL and CR during the opening and closing cycle, by reason of imperfect synchronization between the panels, bending and backlash in the closing mechanism, etc., must be rendered negligible.

(2) The effects of different spacing between the cab and hatch doors at various landings must be suppressed.

(3) The proximity detector system must not respond to persons just inside the car door or just beyond the hoistway doors, such as might occur when the cab is full, or when persons in the hall near a station are awaiting a cab going in the opposite direction to the one stopped at the station.

(4) The system should not be affected by dirt, temperature, humidity or rough use by the public.

(5) Satisfactory protection should be maintained throughout the entire closing cycle.

(6) The intervals between which maintenance is required should be long, and required maintenance should be simple to perform.

(7) The system should be insensitive to expected component changes.

(8) The system should not be inconvenient or harmful to passengers.

(9) The system should be "fail-safe."

(10) The passenger protection should be provided over the full height of door edge from floor level to above shoulder height.

(11) The protection should be provided when the hand is placed on the door edge in a normal manner.

(12) It should be possible to install "sight guards" on the hatch door to hide door mechanism from view.

(13) The system should be applicable to side-opening, center-opening, and single and two-speed doors.

(14) It is desirable that system protect against inanimate objects such as brief cases, carts, and baby carriages, etc.

(15) A person or object should not be detected unless he or it is likely to be struck by doors, i.e., detection distance should not extend far from the moving door panels.

(16) The system should be of reasonable cost.

(17) The system should not be affected by external electrical noise or other extraneous influences.

A block diagram of a system in accordance with this invention is shown in FIG. 3. Each cab door panel CL and CR has a sensor assembly SL and SR which is mounted vertically, adjacent to the leading edge of the panel. Each sensor SL and SR is connected in a balanced network as shown in FIG. 4. In this network the effect of the capacitance-to-ground of the sensor is cancelled and a null input to the detector circuit is produced when no person is present. The channel conductor or shield 27 is connected to a center tap on the oscillator supply, the high potential side of the supply is connected through a nulling capacitor C1 and C2 to the concave conductor 25. With C1 or C2 equal to the capacity to ground of the sensor and with no person or object present, the capacitances divide the supply voltage equally and no signal appears at the output terminals. The presence of a person upsets this balance and causes an output.

The conductor 25 is concave-shaped and extends from a few inches off the floor to above shoulder height. It is enclosed on three sides by a conducting shield or channel 29 and a grounded conducting strip 35 which reduces the capacitance to ground and shapes the detection zone to cover the desired region. The entire sensor SL and SR is encapsulated in a cast block of epoxy material for protection and to provide an attractive appearance. Attached to each sensor SL and SR are small preamplifiers PL and PR including the means of combining the signals from the two doors. In the right door preamplifier PR, the sensor signal is fed into a cathode-follower CF3 which provides a convenient-low-impedance output for operating into the phase-shift network PH1 or PH2. Two different phase shifts are provided: the 180° shift is obtained through network PH1 and transformer T1, the 120° shift is obtained from a 60° phase shift network PH2 in combination with the 180° shift in the transformer T1.

During the first portion of the door closing cycle, the signals from the two doors are vectorially added 120° out of phase. This is to account for instances in which a person is in a position to be detected by the lobes 51 and 55 of both panels. As an example, if a person is equidistant from both sensors, the vector sum is equal to the signal from either lobe. The maximum error with this arrangement occurs when a person produces twice the signal in one lobe as in the other. In this case, the vector sum is 0.867 of the larger signal rather than its full magnitude.

As the panels close, each sensor SL and SR begins to detect the A.C. voltage on the opposite sensor. This is equivalent to a reduction in the sensor to ground capacitance. When the doors are about 12 inches apart, this effect begins to increase rapidly. At this point the sensors SL and SR are switched to 180° phase displacement by shunting out the 60° phase shift network PH2. The result is the cancellation of changes in the capacity to ground since they are equal for both doors, while still providing protection when a person is closer to one door. At the last ½ to ¾ inch of panel opening, the sensitivity is cut off entirely.

The left door preamplifier PL has a cathode follower CF1 input for the electrode signal and a summing network Σ1 which combines the signals from the two sensors. The output cathode follower CF2 feeds the signal to the detector DR at a low impedance level. In the cathode of this stage are two sensitivity switching relays K1 and K3; one of which reduces the signal to about one-third, the other cuts the signal off entirely when the doors are nearly fully closed.

The detector DR contains the amplifiers MA1 and MA2 and filters F1 and F2 and output relay O. Two identical amplifier channels MA1 and MA2 have been provided. One is for the signal from the sensors SL and SR and the other, called the bias channel BC, is for the reference voltage which controls the operating point of the output relay. This arrangement compensates for a great many of the changes which would affect the system sensitivity, including oscillator frequency change, oscillator amplitude change, aging of tubes, temperature effects on component values, and changes in supply voltage.

The signal is fed to a filter which rejects low frequency noise, and then to a bandpass filter stage of the parallel-T feedback type. Following this are two gain stages each having cathode feedback. To secure a low impedance source for the comparison circuit, the signal is run through a cathode-follower stage CF5. A completely similar circuit is used for the bias channel BC which has output cathode-follower CF6. The outputs from each cathode follower CF5 and CF6 are rectified and filtered; the sensor signal being rectified to give a negative D.C. voltage and the bias to give a positive D.C. voltage. These two D.C. voltages are subtracted and the result is applied to the grid of the output pentode PE. Normally, with no person present, there is no door signal output and the full positive D.C. voltage from the bias channel is applied to the grid of the pentode through a high impedance resistor, holding in the relay O in the conducting pentode plate circuit. As a person or object approaches a sensor SL or SR, the signal increases and overcomes the bias voltage. When the pentode grid has been driven a few volts negative, the tube current decreases to a point where the plate relay O drops out, and the doors are then reopened. In effect the pentode operates as a switch which is insensitive to changes in grid cutoff voltage.

The transistor power oscillator typically supplies 30 and 60 volts R.M.S. at a nominal 2000 c.p.s. Since the centertap voltage is used as a common return for much of the circuit, the preamplifiers PL and PR and detector DR are operating at this A.C. potential. The 30-volt level was selected to provide reasonable sensitivity at safe magnitudes. Any increase in sensitivity that would be gained by providing a higher voltage has not been utilized in the interest of safety, sufficient amplifier gain is readily provided for the lower voltage. The 2000 c.p.s. oscillator frequency is sufficiently high that simple filters can be used to reject 60 cycle and other low frequency noise, and is not so high that serious difficulties arise from pickup within the chassis and capacitive loading by the cable wiring. Also, the capacitive impedance in the electrode are reasonably low. Any change in this frequency should probably be toward a higher value.

While a preferred embodiment of this invention has been disclosed herein many modifications thereof are feasible. This invention then is not to be restricted except insofar as is necessitated by the spirit of the prior art.

We claim as our invention:

1. An elevator installation including a cab movable in a hoistway and having first door means, means connected to said door means for moving said door means between open and closed positions, said hoistway including second door means at landings along said hoistway where said cab may be loaded and unloaded, means connected to said second door means for moving said second door means with said first door means between said open and closed positions, at least first and second capacitive sensors connected to said first door means movable therewith between a position in which said sensors are spaced a predetermined distance when said first door means is open and are near each other when said first door means is closed, each said sensors having a capacitive space field, and detecting means connecting to said sensors and responsive to the presence of an object outside said cab in the capacitive space field of said sensors for maintaining said first and second door means open so long as said object is so present, the said detecting means including the following: a supply of alternating potential, means connected to said supply for impressing alternating potentials on said sensors, means for introducing a displacement in phase between the potentials impressed on said sensors, and means for adding said potentials impressed on said sensors vectorially.

2. The installation according to claim 1 wherein the phase shift is introduced by phase-shift means interposed between the supply and the sensors.

3. The installation according to claim 1 wherein the phase shift is introduced by phase-shift means interposed between the sensors and the adding means.

4. The installation according to claim 1 wherein the phase shift is on the order of 120°, and which includes means connected to the door means for increasing the phase shift to 180° when the door means is near to being closed.

5. The installation according to claim 1 wherein the phase shift is of the order of 180°.

6. An installation according to claim 1 wherein the sensitivity of the detecting means is progressively decreased as the first door means approaches the closed position from the open position.

7. The installation according to claim 1 wherein each sensor includes a plate of electrically conducting material of generally concave form as viewed from a position outside the cab.

8. The installation of claim 1 wherein each sensor includes a plate of electrically conducting material of concave form shielded by a conducting shield which concentrates the lobes of constant sensitivity of the sensor in a direction away from the interior of the cab.

9. An elevator installation including a cab movable in a hoistway and having first door means, means connected to said door means for moving said door means between open and closed positions, said hoistway including second door means at landings along said hoistway where said cab may be loaded and unloaded, means connected to said second door means for moving said second door means with said first door means between said open and closed positions, at least first and second capacitive sensors connected to said first door means movable therewith between a position in which said sensors are spaced a predetermined distance when said first door means is open and are near each other when said first door means is closed, each said sensors having a capacitive space field, and detecting means connecting to said sensors and responsive to the presence of an object outside said cab in the capacitive space field of said sensors for maintaining said first and second door means open so long as said object is so present, the said detecting means including the following: a supply of alternating potential of a frequency which is substantially higher than commercial frequency, means connected to said supply for impressing alternating potentials of said high frequency on said sensors, and means for adding said potentials impressed on said sensors.

10. The installation of claim 1 wherein the capacitive space field of each capacitive sensor encompasses only a limited directional volume near the first door means and extending just beyond the second door means but not including to any substantial extent the second door means, said space field being movable with the first door means, and as said space field moves said volume not including said second door means as said second door means also moves with said first door means.

11. The installation of claim 1 wherein each sensor includes a probe, the installation also including means for impressing a test potential on said probe and means connected to said probe and responsive to said test potential for producing an indication whether or not the object responsive apparatus including the said sensor is operating satisfactorily.

12. The apparatus of claim 11 including means for selectively setting the test potential of the probe in accordance with the sensitivity of the detecting means.

13. The installation of claim 1 wherein each sensor includes a plate of electrically conducting material of concave form shielded by a conducting shield and a conducting plate outside of said shield, the alternating potential being impressed between said shield and said concave plate, said shield and concave plate both being at a potential substantially displaced from ground, and said plate outside said shield being grounded, said concave plate, shield and grounded plate concentrating the lobes of constant sensitivity of the sensor in a direction away from the interior of the cab and progressively in the direction in which the cab and hoistway panels move while closing.

14. Apparatus for determining the presence of an object in a limited directional volume of a region, which apparatus shall be non-responsive to objects outside of said volume, the said apparatus comprising a structure, a first sensor having an alternating output dependent on the presence in the field of said sensor of a detectable object displaced in a first direction from the sensor, means for moving the sensor relative to the structure in said first direction from a first position towards a second position, a second sensor having an alternating output dependent on the presence in the field of the second sensor of a detectable object displaced in a second direction opposite to said first direction from the second sensor, said second sensor being positioned to be approached by said first sensor during said movement, and translating means responsive to a resultant vector function of the two alternating outputs for operation from a first to a second condition.

15. The apparatus of claim 14 wherein said alternating outputs are of the same frequency and are displaced in phase.

16. The apparatus of claim 15 wherein said alternating outputs are displaced in phase substantially by 120°.

17. The apparatus of claim 15 wherein said alternating outputs are displaced in phase substantially by 180°.

15

18. The apparatus of claim 14 wherein said structure comprises a cab having a first door opening, a first door mounted for movement in said first direction from an open to a closed position, said first sensor being mounted on said door adjacent that edge of the door which is the leading edge during door closure to detect objects in the door opening, a fixed structure defining a path for said cab having a second door opening aligned with said first door opening in one position of the cab, a second door mounted for movement to lag behind the first door to a minor definite extent during a substantial part of the door closure movement.

16

References Cited

UNITED STATES PATENTS 2,720,284   10/1955   Galanty _____ 187—48
3,018,851   1/1962   Diamond _____ 187—48

RICHARD E. AEGERTER, *Primary Examiner.*

EVON C. BLUNK, *Examiner.*

H. C. HORNSBY, *Assistant Examiner.*